United States Patent
Billaud et al.

(10) Patent No.: US 6,489,063 B1
(45) Date of Patent: Dec. 3, 2002

(54) ADDITIVES FOR IMPROVING THE REVERSIBILITY OF A CARBON ELECTRODE OF A LITHIUM ION SECONDARY ELECTROCHEMICAL GENERATOR

(75) Inventors: Denis Billaud, Nancy (FR); Abdelaziz Naji, Nancy (FR); Patrick Willmann, Montgiscard (FR)

(73) Assignee: Centre National d'Etudes Spatiales, Paris (FR)

( * ) Notice: Subject to any disclaimer, the term of this patent is extended or adjusted under 35 U.S.C. 154(b) by 0 days.

(21) Appl. No.: 09/581,234
(22) PCT Filed: Dec. 22, 1998
(86) PCT No.: PCT/FR98/02828
§ 371 (c)(1),
(2), (4) Date: Oct. 6, 2000
(87) PCT Pub. No.: WO99/34468
PCT Pub. Date: Jul. 8, 1999

(30) Foreign Application Priority Data

Dec. 23, 1997 (FR) .............................. 97 16355

(51) Int. Cl.⁷ ............................................ H01M 10/40
(52) U.S. Cl. ........................ 429/330; 429/326; 252/62.2
(58) Field of Search ................. 429/330, 326; 252/62.2

(56) References Cited

U.S. PATENT DOCUMENTS 5,529,859 A    6/1996  Shu et al.

FOREIGN PATENT DOCUMENTS

| EP | 0 390 145 | 10/1990 |
| EP | 0 696 077 | 2/1996 |
| FR | 2.082.817 | 12/1971 |
| JP | 7-192762 | 7/1995 |
| JP | 07 192762 | 7/1995 |
| JP | 10-05582 | 2/1998 |
| JP | 10-189008 | 7/1998 |
| JP | 10 189008 | 7/1998 |

OTHER PUBLICATIONS

Patent Abstracts of Japan, vol. 012, No. 077 (E–589), Mar. 10, 1988, JP 62–216171, Sep. 22, 1987.
Patent Abstracts of Japan, vol. 097, No. 003, Mar. 31, 1997, JP 08–298134, Nov. 12, 1996.
Patent Abstracts of Japan, vol. 098, No. 001, Jan. 30, 1988, JP 09–251862, Sep. 22, 1997.
Patent Abstracts of Japan, vol. 098, No. 004, Mar. 31, 1998, JP 09–320633, Dec. 12, 1997.
Patent Abstracts of Japan, vol. 097, No. 010, Oct. 31, 1997, JP 09–147865, Jun. 6, 1997.
A.N. Dey et al., J. Electrochem, Soc., vol. 117, No. 2, pp. 222–224, "The Electrochemical Decomposition of Propylene Carbonate on Graphite," Feb. 1970.
M. Arakawa et al., J. Electrochemical. Chem., vol. 219, pp. 273–280, "The Cathodic Decomposition of Propylene Carbonate in Lithium Batteries," 1987.
D. Billaud, et al., J. Chem, Soc., Chem. Commun., pp. 1867–1868, "Reversible Electrochemical Insertion of Lithium Ions into Graphite in LiClO₄–Propylene Carbonate Electrolyte," 1995.
Z.X. Shu, et al., J. Electrochem. Soc., vol. 143, No. 7, pp. 2230–2235, "Use of Chloroethylene Carbonate as an Electrolyte Solvent for a Graphite Anode in a Lithium–Ion Battery," Jul. 1996.

*Primary Examiner*—Carol Chaney
(74) *Attorney, Agent, or Firm*—Oblon, Spivak, McClelland, Maier & Neustadt, P.C.

(57) ABSTRACT

The invention relates to additives to improve the reversibility of a carbon electrode of a lithium ion secondary electrochemical generator. These additives are composed of cyclic or non-cyclic α-halogenated esters such as α-bromo-γ-butyrolactone or methyl chloroformiate. They may be added to the electrolyte at a rate of 0.5 to 3% by volume or adsorbed on the carbon electrode to form a passivation film on said electrode during the first use of the generator.

12 Claims, 6 Drawing Sheets

ADDITIVES FOR IMPROVING THE REVERSIBILITY OF A CARBON ELECTRODE OF A LITHIUM ION SECONDARY ELECTROCHEMICAL GENERATOR

FIELD OF THE INVENTION

The present invention relates to the use of additives to improve the reversibility, in the presence of propylene carbonate, of a carbon electrode of a lithium ion secondary electrochemical generator.

It particularly applies to the production of specific high-power secondary generators, which are of great interest for the development of portable devices and, on a more long-term level, for the production of electric vehicles.

STATE OF THE RELATED ART

At the present time, for these applications, the choice seems to focus on lithium ion secondary electrochemical generators using a carbon compound, particularly graphite, as a negative electrode.

Indeed, graphite is currently the most promising carbon since, in its lamellar structure, it can accept up to one lithium atom for six carbon atoms, at potentials close to that of metallic lithium. However, lithium can only be inserted into graphite in a reversible manner in a few appropriate electrolytes. In this way, it is difficult to use propylene, in spite of its good properties, in such generators, since it has the disadvantage of decomposing in the graphite structure and thus preventing the insertion of lithium in the graphite electrode.

A. N. Dey and B. P. Sullivan reported this problem of the decomposition of propylene carbonate in the graphite electrode, in J. Electrochem. Soc., 117, 1970, pages 222–224, [1]. Similarly, M. Arakawa and J. Ichi Yamaki reported this problem and proposed a propylene carbonate decomposition schedule in J. Electroanal. Chem., 219, 1987, p. 273–280, [2].

To, overcome these difficulties, D. Billaud, A. Naji and P. Willmann proposed in J. Chem. Soc., Chem. Commun., 1995, pages 1867 and 1868, [63], to subject the graphite electrode to a pre-treatment to form on said electrode a protective coat impervious to propylene carbonate molecules but enabling the diffusion of lithium ions. This protective coat is formed by electrochemical reduction, in an electrolyte comprising ethylene carbonate and lithium perchlorate.

Another solution to avoid this disadvantage was described by Z. X. Shu, R. S. McMillan, J. J. Murray and I. J. Davidson in J. Electrochem. Soc., 143, No. 7, July 1996, p. 2230–2235, [4]. In this case, an electrolyte mixture of chloroethylene carbonate and propylene carbonate is used.

The first solution described in reference [3] has the disadvantage of requiring an electrode pre-treatment step, before the electrode is used in the secondary electrochemical generator with a propylene carbonate-based electrolyte.

The second solution described in reference [4] has the disadvantage of requiring a significant proportion of additive since chloroethylene carbonate, chloro-EC, with the formula:

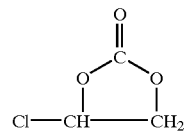

(I)

generally represents 50% by volume of the electrolyte, and this proportion of chloro-EC must not be less than 30%.

The precise purpose of the present invention is to improve the reversibility of the insertion of lithium in a carbon electrode of a lithium ion secondary electrochemical generator using an electrolyte comprising propylene carbonate, which makes up for these disadvantages.

DISCLOSURE OF THE INVENTION

According to the invention, the process to improve the reversibility of the insertion of lithium in a carbon electrode of a lithium ion secondary electrochemical generator, using an electrolyte comprising propylene carbonate, consists of forming electrochemically, during the first use of the generator, a passivation film on the surface of the carbon electrode essentially using an organic compound selected from the cyclic and non-cyclic α-halogenated esters.

These organic compounds are of particular interest since they make it possible to form a passivating coat on the carbon electrode, during the first use of the electrochemical generator, while being used in a much lower quantity than that required in the case of chloroethylene carbonate used in reference [4].

According to the invention, a α-halogenated ester that is liquid at ambient temperature or soluble in propylene carbonate PC or in a mixture of PC and other solvents, and is also stable under the operating conditions of the electrochemical generator, is selected.

The halogen used in the ester may particularly be chlorine, bromine or iodine.

Examples of such non-cyclic α-halogenated esters include alkyl halogen formiates and halogen acetates, particularly alkyl chloroformiates and chloroacetates.

Chloroformiates comply with the formula ClCOOR where R represents a linear or ramified alkyl group, preferably a lower alkyl group, with one to four carbon atoms such as the methyl or ethyl groups. In particular, it is possible to use methyl chloroformiate.

Alkyl chloroacetates comply with the formula ClCH$_2$-COOR where R has the same significance as above.

Other non-cyclic esters liable to be used may comply with the formula R-CHCl-COOR where the Rs may be the same or different, with the same significance as above.

According to the invention, it is also possible to use cyclic α-halogenated esters complying with the following formula, for example:

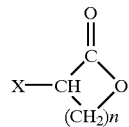

(II)

wherein X represents a halogen such as Cl, Br or I, and n is a whole number ranging from 1 to 3, it being possible to replace one or more of the CH$_2$ groups by methyl, ethyl, propyl or butyl groups.

An example of a cyclic ester of this type is α-bromo-γ-butyrolactone BrBL which complies with formula (II) given above, where n=2 and X represents Br.

According to a preferred embodiment of the invention, the organic compound selected from the cyclic and non-cyclic α-halogenated esters is added to the electrolyte of the electrochemical generator, so as to enable the formation of the passivation film on the surface of the electrode during the first use of the generator.

According to a second embodiment of the invention, the organic compound selected from the cyclic and non-cyclic α-halogenated esters, is adsorbed on the carbon electrode. In this case, the electrode is first of all subjected to an organic compound adsorption step by immersing it in said compound, before using it in the electrochemical generator. As described above for the first use, a passivation film on the carbon electrode is formed from the adsorbed compound by electrochemical reduction.

In the first embodiment of the invention, the electrolyte advantageously comprises a solution of at least one lithium salt in a solvent composed of a mixture comprising propylene carbonate and the organic compound selected from the cyclic and non-cyclic α-halogenated esters.

The lithium salt(s) used may be selected from the salt generally used in lithium ion electrochemical generators. Lithium perchlorate $LiClO_4$, lithium hexafluoroarseniate $LiAsF_6$, lithium hexafluorophosphate $LiPF_6$, lithium tetrafluoroborate $LiBF_4$, lithium trifluoromethanesulfonate (lithium triflate) $CF_3SO_3Li$ and lithium trifluorosulfonylimide (LiTFSI) $LiN(CF_3SO_2)_2$ are preferably used.

In an electrolyte of this type, the added organic compound content may be low. It is selected so as to form a passivation film with a sufficient thickness over the entire surface of the electrode to prevent contact between the propylene carbonate molecules and the carbon electrode, but this proportion must not be excessively high since, if the film is too thick, it will prevent the diffusion of the lithium ions in the electrode.

When α-bromo-γ-butyrolactone is used as the added organic compound, it may represent 0.5 to 3% by volume of the solvent composed of the mixture of propylene carbonate and α-bromo-γ-butyrolactone, and preferably 1 to 2% by volume of the solvent.

The lithium salt concentrations of the electrolyte according to the invention are generally such that the electrolyte contains at least 0.1 mol/l of lithium ions. For example, the lithium salt concentration may be within the range from 0.1 mol/l to saturation.

In the lithium ion electrochemical generator using such an electrolyte and a carbon electrode, the other electrode, or positive electrode, may be made of various materials such as oxides, sulphides or oxysulphides.

Examples of oxides that may be used include vanadium oxide $V_2O_5$, nickel oxide $NiO_2$, cobalt oxide $CoO_2$, mixed. cobalt and nickel oxides, manganese oxides, molybdenum oxide $MoO_3$, chromium oxides and vanadium bronzes $M_xV_2O_5$, where M represents iron, sodium, potassium, lithium, silver, aluminium, chromium, barium, nickel or cobalt.

Examples of sulphides that can be used include titanium sulphide $TiS_2$, molybdenum sulphide $MoS_2$ and mixed nickel and molybdenum sulphides.

Examples of oxysulphides that can be used include molybdenum and titanium oxysulphides.

In an electrochemical generator of this type, using an electrolyte according to the invention, a separator is generally placed between the electrodes and said separator may be composed of a microporous film made of polypropylene or polyethylene, for example.

The generator. may be produced in, the form of a cylindrical generator comprising a spiral winding of the two electrodes separated by the separator if required. It may also be produced in the form of a prismatic type generator with plane electrodes facing each other and possibly a separator placed between these electrodes.

Other characteristics and advantages of the invention will be seen more clearly upon reading the following description, which is naturally given as a non-restrictive illustration with reference to the appended drawings.

BRIEF DESCRIPTION OF THE FIGURES

In FIGS. 1 to 3, 5, 6, 8, 10 and 11, the number x of lithium atoms exchanged in $Li_xC_6$ is given on the X-axis and the voltage (in volts) with reference to $Li^+/Li$ is given on the Y-axis.

DETAILED DISCLOSURE OF THE EMBODIMENTS

The following examples illustrate the effect of α-bromo-γ-butyrolactone BrBL or methyl chloroformiate on the reversibility of a graphite electrode composed of a 15 m²/g graphite powder (marketed under the reference $UF_4$ by Carbone Lorraine) and a binder composed of polyvinyldene fluoride PVDF, the electrode comprising 4% PVDF by weight.

In the examples, the electrolytes were prepared from propylene carbonate degassed under vacuum and lithium salts $LiClO_4$, $LiBF_4$ and $LiAsF_6$, degassed respectively at 150° C., 80° C. and 120° C. When the additive is BrBL or methyl chloroformiate Cl—MF, said additive was degassed under vacuum.

EXAMPLE 1

In this example, an electrolyte according to the prior art composed of a propylene carbonate solution containing 1 mol/l of lithium perchlorate is used.

In this example, the behaviour of the graphite electrode is tested in a two-electrode electrochemical cell comprising a first lithium electrode acting both as a reference and counter-electrode and a second working electrode which is the composite graphite electrode bound with PVDF.

The cell is cycled between 2 and 0 V with reference to $Li^+/Li$ in galvanostatic mode using a potentiostat/galvanostat at a current density equal to 20 $\mu$A/mg.

Figure 1:
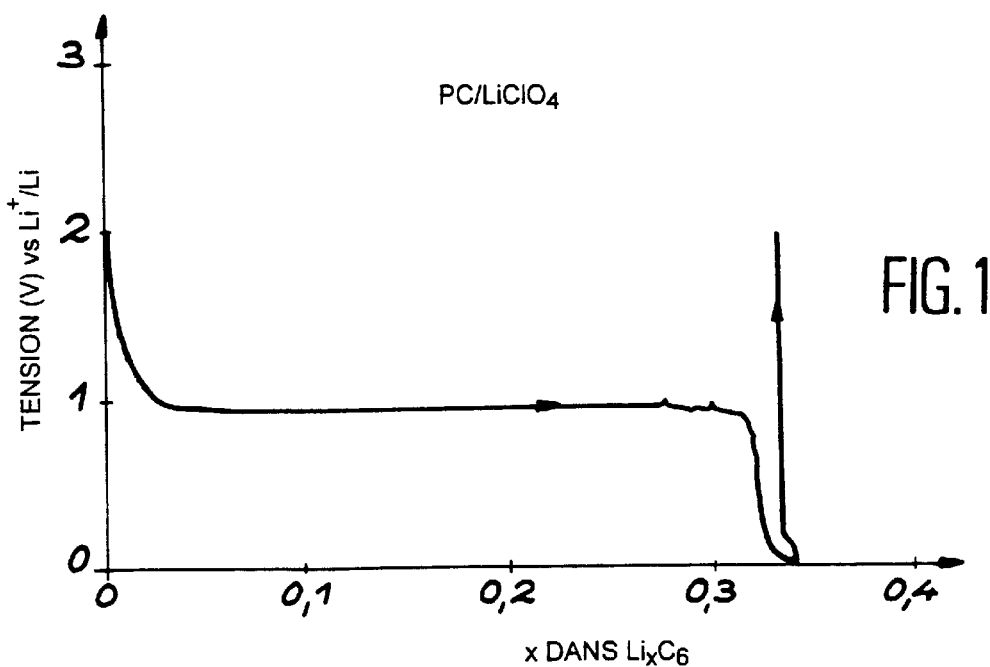
FIG. 1 illustrates the first galvanostatic charging/discharging cycle of a graphite electrode in an electrolyte according to the prior art.

FIG. 1 shows the first galvanostatic charging/discharging cycle of a graphite electrode in an electrolyte according to the prior art. In this figure, which represents the number x of lithium atoms exchanged by the graphite electrode $Li_xC_6$ as a function of the voltage with reference to $Li^+/Li$ (in volts), it can be seen that the reduction curve comprises a long plateau at around 0.9 V attributed to the decomposition of propylene carbonate in the graphite structure.

The reduction of. the graphite is characterised by an exfoliation phenomenon preventing the insertion of the lithium. A negligible reversibility is noted and a gaseous release accompanied by the breakdown of the electrode is observed in the cell.

EXAMPLE 2

In this example, an electrolyte according to the invention, composed of a solution comprising 98% propylene carbonate by volume, 2% BrBL by volume and 1 mol/l of lithium perchlorate $LiClO_4$, is used.

The same cell as in example 1 is used and the same procedure is followed, but five graphite electrode charging/discharging cycles are carried out.

Figure 2:
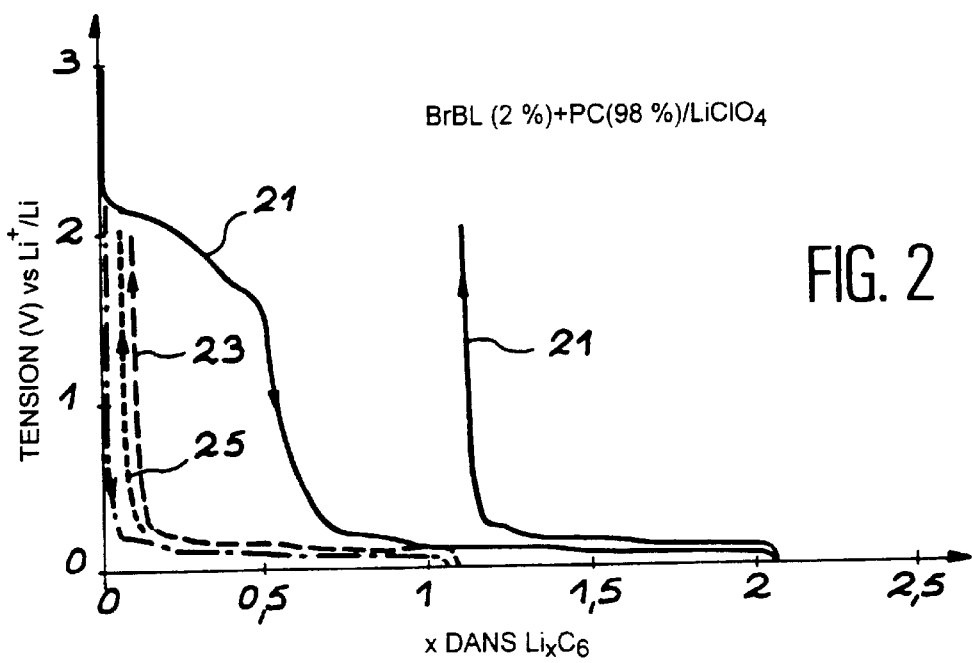
FIG. 2 represents the first galvanostatic charging/discharging cycles of the same electrode in an electrolyte according to the invention.

The results obtained are represented in FIG. 2 which illustrates the number x of lithium atoms inserted in the graphite electrode $Li_xC_6$ as a function of the voltage with reference to $Li^+/Li$ (in volts). In this figure, the curves 21, 23 and 25 refer to the graphite electrode charging/discharging cycles 1, 3 and 5, respectively.

In the curve 21 in this figure, a shoulder is observed at 2.2 volts which is attributed to the reduction of the electrolyte, this phenomenon being totally irreversible. When the electrode is polarised at low potential, the insertion reactions take place. This is conveyed in the electrochemical curves by the formation of different plateaux, three potential values observed in the reduction wave are associated with three others in the oxidation wave. These Redox processes observed below 0.25 volts correspond to a reversible lithium insertion phenomenon.

These curves show that it is possible to insert lithium in a reversible manner in the graphite using the electrolyte according to the invention which comprises 2% BrBL by volume. This is explained by the reduction of said electrolyte at high potential (2.2 volts) resulting in the formation of a passivation film on the electrode. The film formed is impervious to propylene carbonate molecules which, for this reason, cannot be decomposed in contact with the graphite. However, the diffusion of lithium ions is possible through this film, enabling the reversible cycling of the electrode, as can be seen in curve 23 and 25.

EXAMPLE 3

In this example, the same procedure is followed as in example 2, but a solution comprising 95% propylene carbonate by volume and 5% BrBL containing 1 mol/l of lithium perchlorate $LiClO_4$ in solution.

Figure 3:
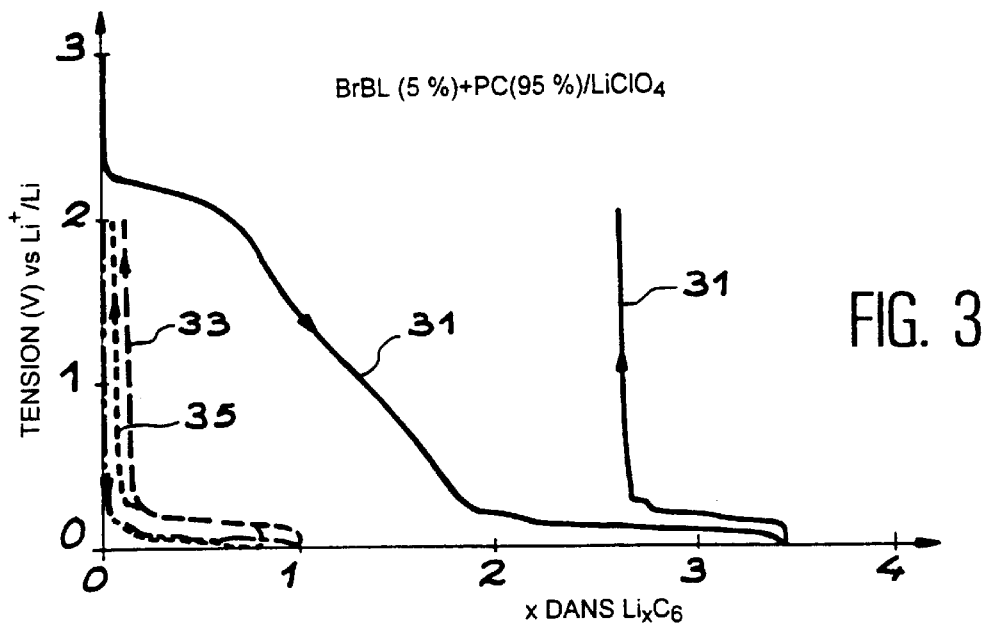
FIG. 3 represents the galvanostatic charging/discharging cycles of a graphite electrode in an electrolyte according to the invention.

In FIG. 3, the charging/discharging cycles of the composite graphite electrode in this electrolyte are shown. In this figure, the curve 31, 33 and 35 refer to cycle 1, 3 and 5, respectively. In this case, a reversibility of the electrode is still obtained but a high irreversibility is observed, probably due to the fact that the passivation film is too thick and prevents the diffusion of the lithium ions in the graphite electrode.

If the same experiment is conducted using an electrolyte comprising 10% BrBL by volume, excess irreversibility is also observed.

However, if an electrolyte comprising 1% BrBL by volume is used, identical results as for example 2 as represented in FIG. 2 are obtained.

Figure 4:
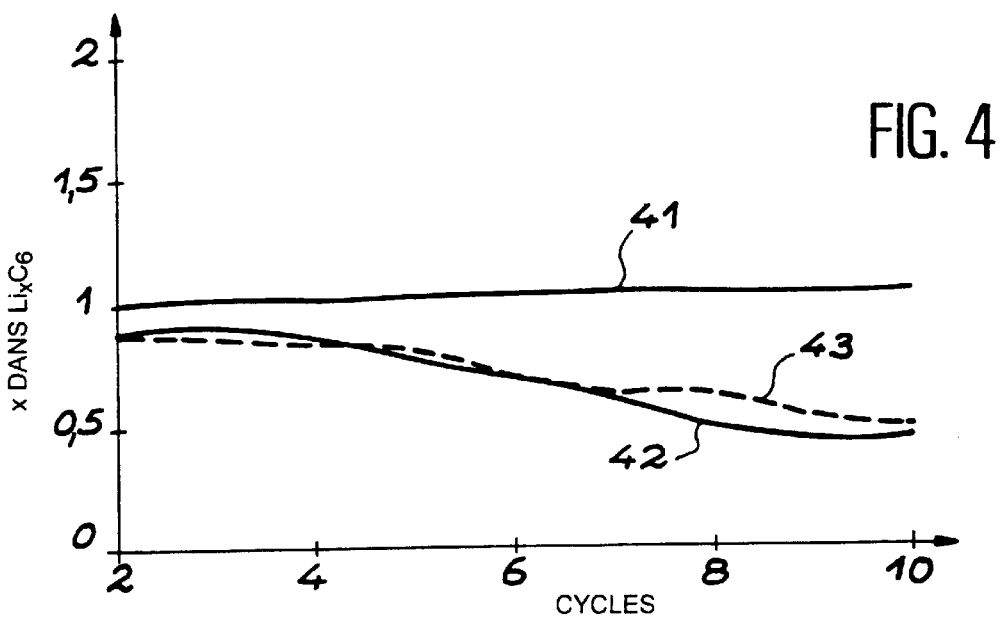
FIG. 4 illustrates the cycling behaviour of a graphite electrode in electrolytes according to the invention and represents the number of lithium atoms exchanged per cycle as a function of the number of cycles carried out.

In FIG. 4, the effect of the BrBL content of the electrolyte on the cycling behaviour of the composite graphite electrode is represented. This figure illustrates the number of lithium atoms exchanged as a function of the number of cycles carried out for a 2% BrBL electrolyte, curve 41, 5% BrBL electrolyte, curve 42, and a 10% BrBL electrolyte, curve 43.

It is thus noted that the capacity remains stable in the 2% BrBL electrolyte while it is lowered during the cycles with the electrolytes containing 5 and 10% BrBL.

EXAMPLE 4

In this example, the behaviour of a composite graphite electrode identical to that in example 1 was tested, in an electrolyte comprising 98% propylene carbonate by volume and 2% BrBL by volume, containing 1 mol/l of lithium tetrafluoroborate $LiBF_4$ in solution. The graphite electrode is tested in the presence of this electrolyte under the same conditions as for example 1.

Figure 5:
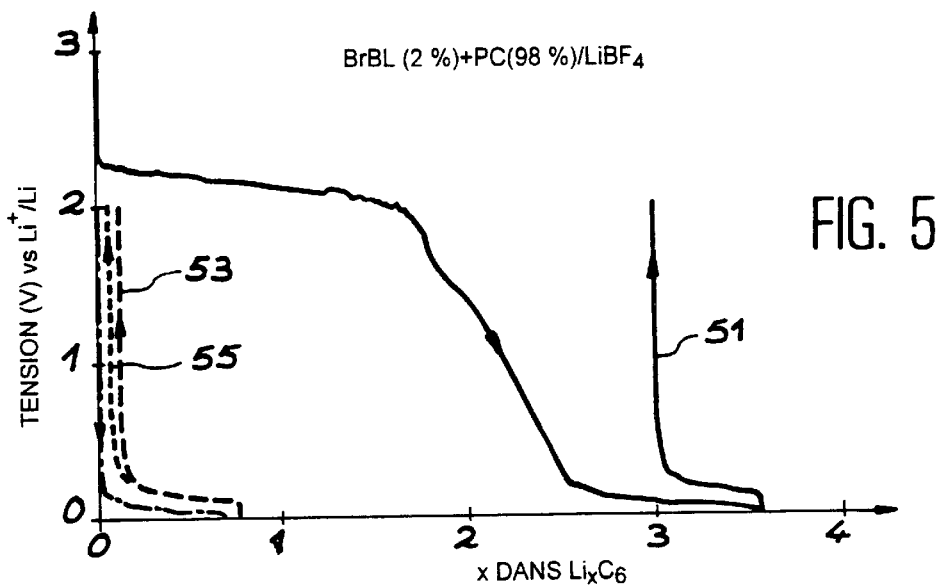
FIGS. 5 and 6 illustrate the charging/discharging cycles of a graphite electrode in electrolytes according to the invention, using different lithium salts.

The results obtained are given in FIG. 5, where curve 51, 53 and 55 refer to cycle 1, 3 and 5, respectively. In this way, it is noted that the use of lithium tetrafluoroborate instead of lithium perchlorate results in a significant loss during the first cycle, a long plateau being observed at around 2.2 volts. Following these reactions, a low cycling yield is observed. It is assumed that the film is probably thicker and more resistant than that developed in the presence of $LiClO_4$. It is thus noted that the type of lithium salt also plays a role in the reversibility of the electrode.

EXAMPLE 5

In this example, the same procedure is followed as in example 4, but lithium hexafluoroarseniate $LiAsF_6$ is used as the lithium salt instead of $LiBF_4$.

Figure 6:
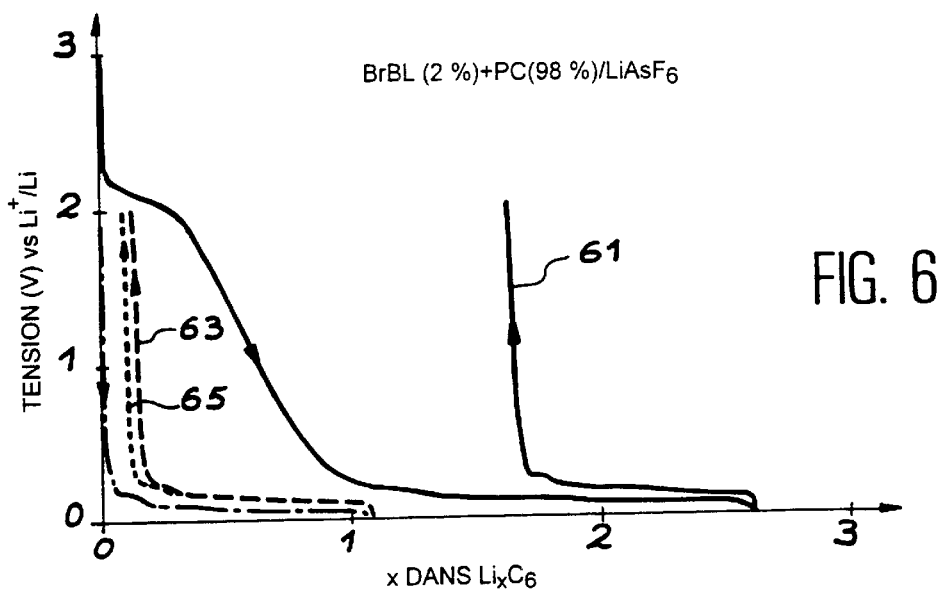

The results obtained are represented in FIG. 6 where curve 61, 63 and 65 refer to cycle 1, 3 and 5, respectively.

In this case, it is noted that the results obtained are comparable to those obtained with the $LiClO_4$ electrolyte.

Figure 7:
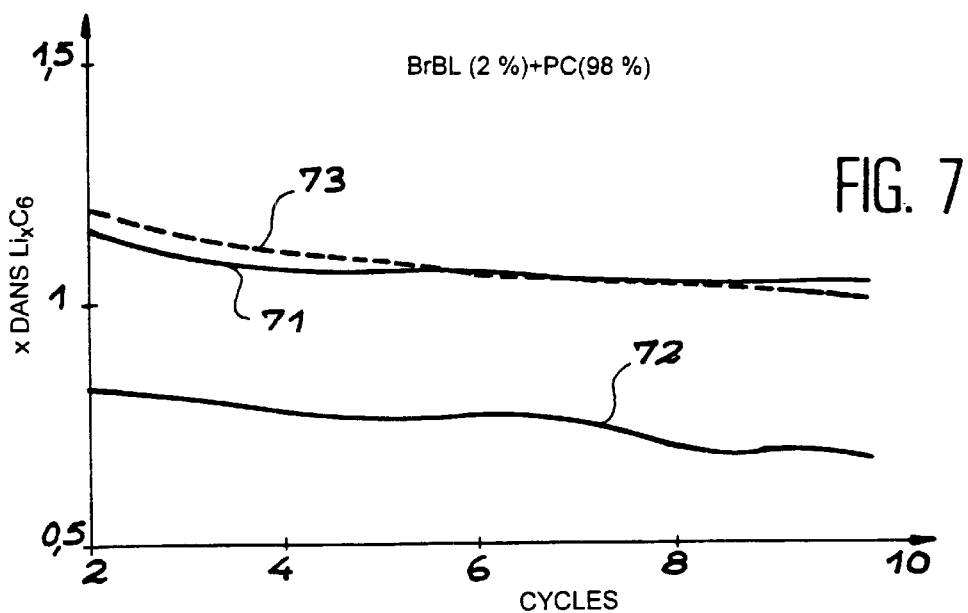
FIG. 7 shows the effect of the electrolyte on the number of lithium atoms exchanged as a function of the cycles carried out for different lithium salts used in the electrolyte.

FIG. 7 contains the results obtained in examples 2, 4 and 5, representing the variation of the number x of lithium atoms inserted in $Li_xC_6$ as a function of the number of cycles carried out. For the electrolyte $LiClO_4$, curve 71, the electrolyte containing $LiBF_4$, curve 72; and the electrolyte comprising $LiAsF_6$, curve 73.

In this way, it is noted that the cyclability is improved in electrolytes based on $LiClO_4$ and $LiAsF_6$ in relation to that containing $LiBF_4$. To explain this result, it is possible to suggest that the passivation film formed in the presence of $LiClO_4$ or $LiAsF_6$ is more porous and more adherent than that formed in the presence of $LiBF_4$. If the proportion of BrBL is increased in these electrolytes based on $LiClO_4$ and $LiAsF_6$, the same behaviour as that observed with $LiBF_4$ is obtained, a poor cycling yield occurring in all the electrolytes containing 5% or more of BrBL by volume.

EXAMPLE 6

In this example, the second embodiment is used, i.e. the graphite electrode is subjected to a preliminary BrBL impregnation treatment.

In this case, before use in the generator, the graphite electrode is immersed in liquid BrBL. An immersion time of less than 2 minutes is sufficient to adsorb a sufficient quantity of BrBL in the electrode.

This electrode is then used in a cell identical to that in example 1 using a propylene carbonate solution containing 1 mol/l of $LiClO_4$ as an electrolyte, and several electrode charging/discharging cycles are carried out.

Figure 8:
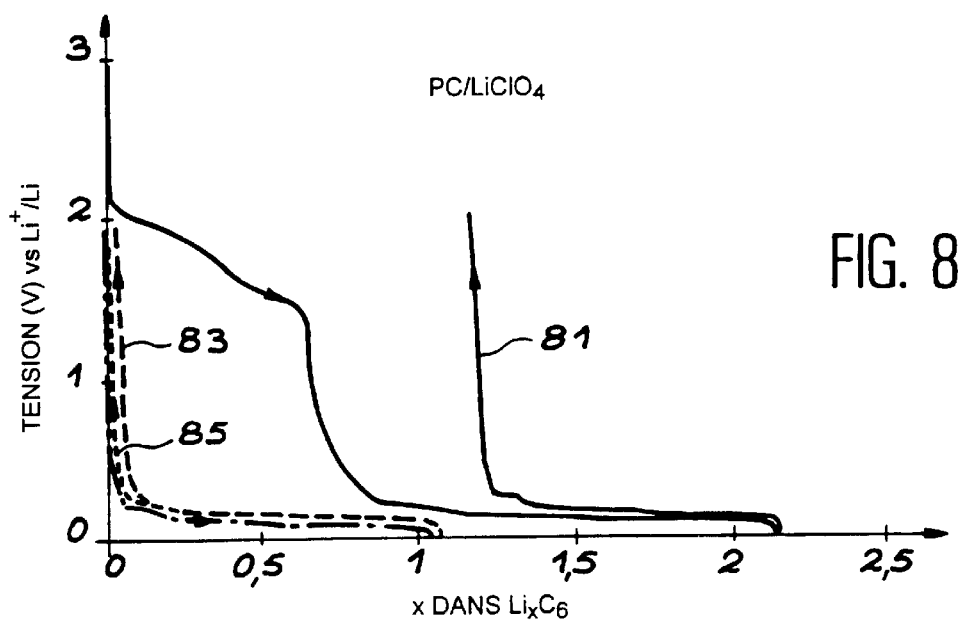
FIG. 8 illustrates the charging/discharging cycles of a graphite electrode according to the second embodiment of the invention using propylene carbonate containing lithium perchlorate as an electrolyte.

The results obtained are represented in FIG. 8 where curve 81, 83 and 85 refer to cycle 1, 3 and 5, respectively.

As for FIG. 2, a first break in the slope is observed at 2.1 volts, attributed to the reduction of adsorbed BrBL, and then the low-potential polarisation of the electrode is accompanied by three reversible transformations attributed to the lithium insertion reactions. This is explained by the fact that the BrBL compound, covering the entire active surface of the electrode, is reduced at 2.1 by the formation of a passivation film which precedes the decomposition of the propylene carbonate in the graphite structure. Cycle 3 and 5 are practically identical to those observed in the case of FIG. 2.

Therefore, the second embodiment of the invention is as effective as the first embodiment consisting of adding BrBL to the electrolyte.

EXAMPLE 7

In this example, the oxidation stability of the electrolyte according to the invention composed of 98% propylene carbonate by volume, 2% BrBL by volume and 1 mol/l of $LiClO_4$, is tested.

To this end, a titanium electrode increased directly from the idle potential to oxidising potentials is used.

Figure 9:
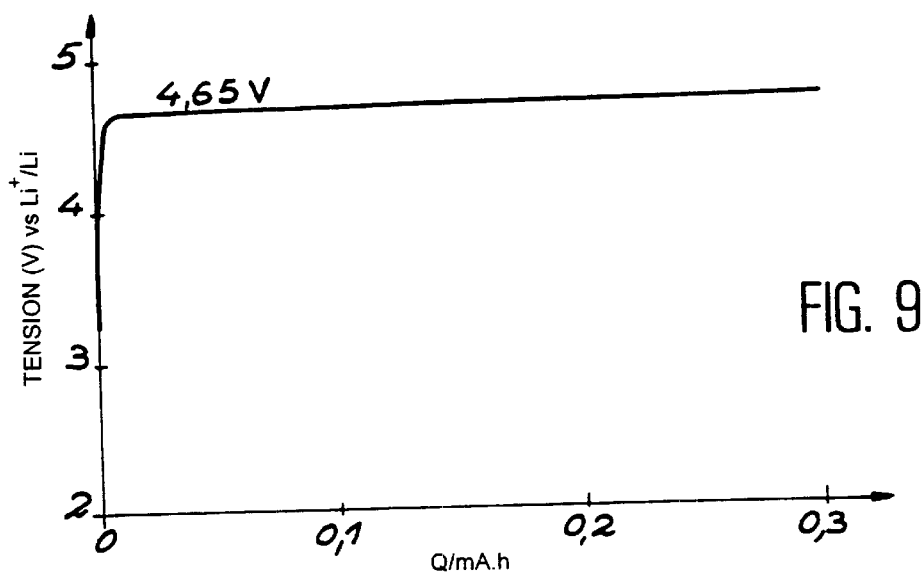
FIG. 9 represents a galvanostatic curve of a titanium electrode increased from idle potential to oxidising potentials in the presence of an electrolyte according to the invention.

FIG. 9 represents the galvanostatic curve of this titanium electrode in contact with the electrolyte according to the invention. The oxidation curve shows than an anodic current starts at approximately 4.65 volts. This potential value is the oxidation wall of the electrolyte.

Therefore, the electrolyte is stable under lithium ion secondary generator operating conditions.

EXAMPLE 8

In this example, the oxidation stability of the passivation film formed on a graphite electrode is tested. In this case, some galvanostatic cycles between 2 and 0 volts were carried out beforehand, in the presence of the electrolyte according to the invention BrBL (2% v) +PC (98% v)/$LiClO_4$. The stability of this film during oxidation of the electrode at around 5 volts is then detected.

Figure 10:
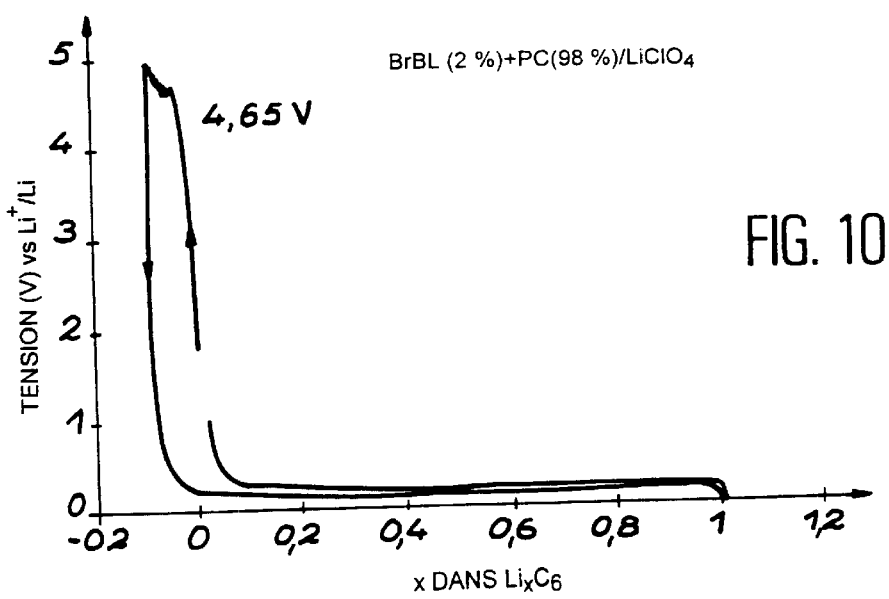
FIG. 10 illustrates the stability of the film formed on the graphite electrode by the process according to the invention, by carrying out oxidation of the electrode at around 5 volts.

FIG. 10 illustrates the galvanostatic curve of this electrode. In this way, it is observed that the limit potential is approximately 4.65 volts. The reduction at 0 volts of the electrode increased to 5 volts is accompanied by the formation of insertion stages with a slightly higher capacity than $LiC_6$ and the reduction is not accompanied by the decomposition of the electrolyte.

In this way, the presence of BrBL does not modify 10 the electro-activity range of the propylene carbonate/$LiClO_4$ medium. In addition, the superficial layer formed on the electrode is stable up to 5 volts.

EXAMPLE 9

In this example, the same procedure as in example 2 is followed to test the effectiveness of methyl chloroformiate Cl—MF on the reversibility of the insertion of lithium in the same graphite electrode as that used in example 2.

In this case, the electrolyte comprise 1% Cl—MF by volume, 99% propylene carbonate by volume and 1 mol/l of $LiClO_4$, and the cell is cycled between 2 and 0 volts with reference to $Li^+$/Li at a current density of 7 mA/g.

Figure 11:
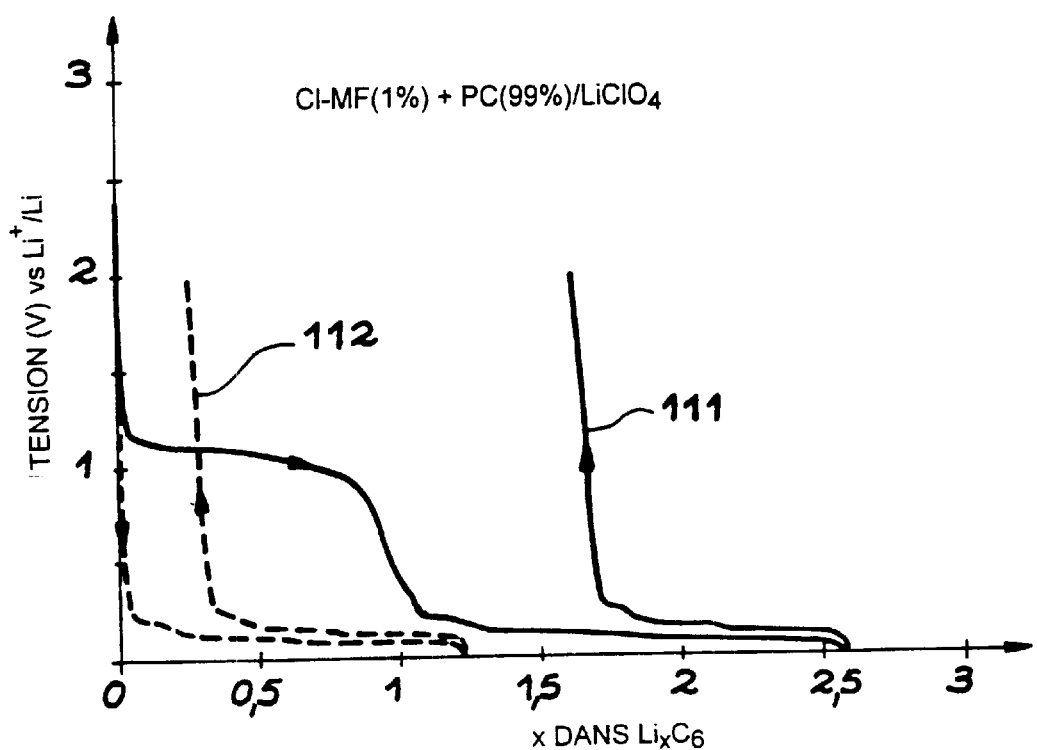
FIG. 11 represents the first two charging/discharging cycles of a graphite electrode in an electrolyte according to the invention.

The results obtained are represented in FIG. 11 which illustrates the number x of Li atoms inserted in the $Li_xC_6$ graphite electrode as a function of the voltage with reference to $Li/Li^+$(in V)

In this figure, curve 111 and 112 refer to cycles 1 and 2, respectively.

These curves demonstrate that it is possible to insert lithium in a reversible manner in the graphite when Cl—MF is used instead of BrBL.

REFERENCES

[1]: J. electrochem. Soc., 117, 1970, p. 222–224.

[2]: J. Electroanal. Chem., 219, 1987, p. 273–280.

[3]: J. Chem. Soc., Chem. Commun., 1995, p. 1867–1868.

[4]: J. Electrochem. Soc., 143, No. 7, July 1996, p. 2230–2235.

What is claimed is:

1. A process to improve the reversibility of the insertion of lithium in a carbon electrode of a lithium ion electrochemical generator, using an electrolyte comprising propylene carbonate, wherein a passivation film is formed electrochemically, during the first use of the generator, on the surface of the carbon electrode essentially from an organic compound selected from cyclic α-halogenated esters with the following formula (II):

$$\text{X—CH} \underset{(CH_2)_n}{\overset{O}{\underset{\diagdown}{\diagup}}} \overset{\parallel}{\underset{O}{C}}$$ (II)

wherein X represents a halogen and n is a whole number ranging from 1 to 3, one or more of the $CH_2$; groups being able to be substituted by methyl, ethyl, propyl or butyl groups.

2. The process according to claim 1, wherein said compound is added to the electrolyte of the electrochemical generator.

3. The process according to claim 1, wherein said compound is adsorbed on the carbon electrode prior to formation of the passivation film.

4. The process according to claim 1, wherein said compound is α-bromo-γ-butyrolactone.

5. An electrolyte, comprising a solution of at least one lithium salt in a solvent comprising a mixture of propylene carbonate and an organic compound selected from cyclic α-halogenated esters with the formula (II):

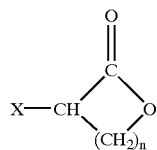

(II)

wherein X represents a halogen and n is a whole number ranging from 1 to 3, one or more of the CH$_2$ groups being able to be substituted by methyl, ethyl, propyl or butyl groups.

6. The eleciolyte according to claim 5, wherein the organic compound is α-bromo-γ-butyrolactone.

7. The electrolyte according to claim 6, wherein the lithium salt is selected from the group consisting of lithium perchlorate LiClO$_4$, lithium hexafluorate LiAsF$_6$, lithium hexafluorophosphate, and lithium trifluoromethane sulfonate.

8. The electrolyte according to claim 5, wherein the lithium salt is selected from the group consisting of lithium perchlorate LiClO$_4$, lithium hexafluoroarseniate LiAsF$_6$, lithium hexafluorophosphate and lithium trifluoromethane sulfonate.

9. The electrolyte according to claim 5, wherein the solvent comprises 0.5 to 3% α-bromo-γ-butyrolactone by volume, the remainder being composed of propylene carbonate.

10. The electrolyte according to claim 5, wherein the solvent comprises 1 to 2% α-bromo-γ-butyrolactone by volume, the remainder being composed of propylene carbonate.

11. The electrolyte according to claim 5, wherein the lithium salt concentration is from 0.1 mol/l to saturation.

12. A process, comprising electrochemically forming a passivation film on a surface of a carbon electrode from at least one organic compound selected from cyclic α-halogenated esters of formula (II):

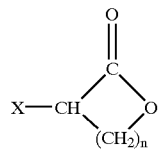

(II)

wherein

X represents a halogen;

n is a whole number ranging from 1 to 3; and one or more of the CH$_2$ groups may be substituted by methyl, ethyl, propyl, or butyl groups.

* * * * *